United States Patent Office 2,713,125
Patented July 12, 1955

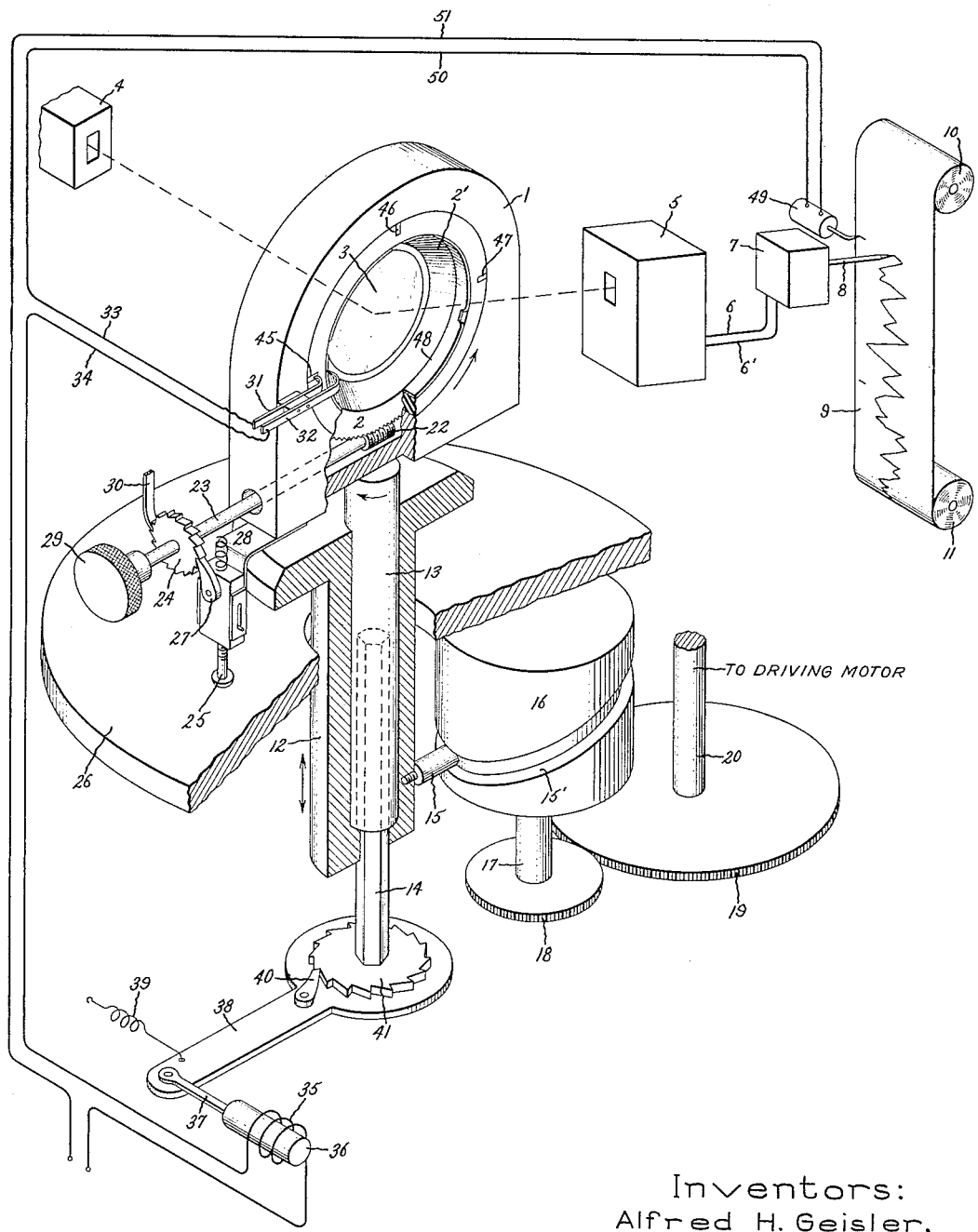

2,713,125

INTEGRATING X-RAY GONIOMETER

Alfred H. Geisler, Schenectady, Eric T. Asp, Scotia, and Beulah F. Decker, Ballston Lake, N. Y., assignors to General Electric Company, a corporation of New York Application November 22, 1952, Serial No. 322,126

7 Claims. (Cl. 250—52)

The present invention provides a method and apparatus for accurately and expeditiously determining the orientation of crystals in a specimen as, for example, a crystalline metal or alloy.

Heretofore, so-called diffraction pole figures have been laboriously plotted in a step-by-step manner and have required many determinations to be made of the diffraction pattern of a beam of X-rays by chosen crystal planes in the specimen.

In accordance with one of the features of our invention a specimen to be examined is scanned over a given segment by causing relative rotative motion between such specimen and a traversing beam of X-rays, the zone of scanning being automatically shifted to parallel adjoining segmental zones, as may be desired and may be predetermined by setting the apparatus.

In addition to such successive primary scanning, means are provided for subjecting the specimen also to a secondary radial or diametrical scanning by relative oscillating motion occurring substantially at right angles to the primary scanning motion. The secondary scan is caused to occur by reason of relative transverse motion between the specimen and the X-ray beam. The diffraction patterns resulting from such multiple scanning steps are recorded on a chart.

As a consequence of the present invention a method and apparatus have been provided for obtaining rapidly and automatically information about the arrangement of crystallite particles in materials not readily a subject of examination by X-ray diffraction as, for example, specimen of metals containing relatively coarse crystals.

In accordance with one of the features of our invention means has been provided for subjecting a specimen to multiple scanning steps with an X-ray beam and in synchronism with said steps recording the variations of diffracted X-rays due to crystalline orientation as a linear graph having a variable slope with respect to a predetermined zero axis.

In accordance with our invention the records of the intensity of the diffracted X-rays are automatically recorded by a stylus on a moving chart in such form that pole figure charts may be plotted therefrom.

Our invention provides a method for scanning with an X-ray beam areas of the specimen under examination and integrating the intensities of X-rays diffracted by the crystals in said areas to obtain mean statistical results from the groups of crystals in said area in order thereby to obtain more representative test results than could be obtained by determining only the intensity at isolated spots of the specimen. By the latter feature of our invention significant results may be obtained by X-ray diffraction study of crystalline materials in which the individual crystals are so coarsely grained that ordinary observations taken at isolated spots are apt to be misleading and of little or no significance.

The accompanying drawing shows in a somewhat diagrammatic manner an automatically operated mechanism for obtaining X-ray diffraction characteristics in different planes and recording the results on a chart.

The drawing shows an automatically operated X-ray goniometer embodying our invention. It provides a semicircular frame 1 wherein is rotatably mounted a specimen holder 2' for supporting material to be examined and which during the transmission of X-rays therethrough is arranged to be rotated in different planes as will be hereinafter described.

The specimen 3 to be examined may consist of a metal of unknown constitution, the crystal texture of which is to be evaluated quickly. The specimen which may consist of a small thin plate is mounted in the path of a collimated beam of X-rays received from a suitable source 4. The X-ray beam is diffracted by traversing the small crystallites which make up the specimen and the diffracted beam is received by a Geiger counter 5. The potential pulses produced by the diffracted X-rays in the Geiger counter are carried by the conductors 6, 6' to an electronic amplifier 7. A stylus 8 is operated by the output circuit of the amplifier and thereby a curve is drawn on a moving record sheet 9 of paper, or other suitable material. Variations of ionization intensity in the counter due to diffractions of X-rays by vertical planes of crystals which are normal to the plane of the incident and diffracted beams are recorded as a variable trace on the strip of paper. The paper strip 9 may be unwound from a roll 10 and wound on a roll 11 by mechanism (not shown) which is timed to operate the chart at desired speed in synchronism with the primary scanning mechanism.

When the specimen being examined is coarsely grained not enough crystals would be encountered by the X-ray beam to make a study of diffraction possible. To overcome this difficulty means is provided to subject an elongated area of the specimen to secondary transverse scanning so as to obtain a statistical result. Integration is achieved by a reciprocating motion of the specimen relative to the X-ray beam so that, for example, a ½" by 1" area of the specimen is scanned in the course of a small change of azimuth angle, for example, a change of ⅛ degree.

The drawings shows the vertically aligned frame 1 as being mounted on a T-shaped vertical shaft 12 which is caused to oscillate. A cylindrical cam follower 15 attached to the hollow shaft 12 engages with a groove 15' in the barrel-type cam 16, which is shaped to provide axial movement of the shaft 12. The cylindrical cam is mounted on a vertical shaft 17 to which is attached a horizontal gear 18 which engages with a gear 19, on a drive shaft 20 which is driven by a motor (not shown). The speed of reciprocation up-and-down is an approximately one inch stroke per second although the reciprocation is not restricted to this particular speed.

The reciprocation of the T-shaped shaft 12 carries with it a rotatable inner cylinder 13 which is carried upward by engagement with the outer shaft at its lower end and drops back by its own weight when the shaft 12 moves down. The hexagonal lower interior surface of the shaft 13 slides upon a hexagonal shaft 14 (the function of which will be described later). The motion of the cylinder 13 produces the secondary scanning motion of the X-ray beam with respect to the specimen.

The specimen holder 2' also is rotated about a horizontal axis in a synchronism with the motion of the chart 9, whereby a plot of intensity against azimuth angle is obtained. As shown in the drawing rotation of the holder (as indicated by the arrow) mounted within the frame 1 is caused by the engagement of a ring gear on the rim of the holder with a rotating worm gear 22 which is mounted on a horizontal shaft 23. Also mounted on the shaft 23 is a ratchet 24. As the shaft 12 and connected parts move up and down a pin 25 engages with the table 26 and causes the pawl 27 mounted by a bracket 28 on the frame 1, to engage with the ratchet 24 thus causing step-wise rotation of the holder 2' within the frame 1. The thumb screw 29 permits manual adjustment of the position of the holder 2'. The pawl 30 prevents undesired reverse movement of the ratchet 24.

The change of angle of the specimen thus accomplished automatically and coordinated with the movement of the chart 9 has eliminated the formerly tedious procedure of making radiation counts at specific increments of azimuth angle.

Our apparatus also provides means for automatic stepwise rotation of the holder 1 and the specimen 3 in a plane at right angles to the plane of the described rotation of the holder by the gear 22.

A stepwise shift in alignment of the circular specimen holder 2' about a vertical axis is produced as follows:

The electric terminal fingers 31, 32 are insulatingly mounted on the frame 1 (as shown) and are connected respectively to circuit conductors 33, 34 leading to a solenoid coil 35, and to source of energy (not shown). The core 36 of this coil is connected by a stem 37 to a lever 38, its pull being in opposition to the spring 39. The lever 38 is provided with a pawl 40 which engages with a ratchet 41. As the latter is affixed to the hexagonal shaft 14, a pull by the coil 35 on the lever 38, causes the pawl 40 to move counterclockwise so as to engage the adjoining tooth of the ratchet 41. When shortly thereafter the coil 35 is deenergized, the spring 39 pulls the lever 38 in the opposite direction whereby the shaft 14 is rotated moving the cylindrical support 13 an angular distance, as indicated by the arrow near the top.

Turning now to the terminal fingers 31, 32 it will be observed that the ring 2 (which consists of insulating material) is provided with a number of conductive contacts (of which 45, 46, and 47 can be seen) which are electrically connected to a conductive ring 48. When the terminal 31 comes into engagement with one of these contacts as shown the circuit 33, 34 is completed energizing the coil 35 which then operates as previously described, thus shifting the impingement of the X-rays to a different radial position on a vertical axis.

Should it be desired to skip completion of the circuit 33, 34 when the contact finger 31 engages with a conductive insert 46; the ring 48 which is circumferentially notched as indicated on the drawing is rotated by hand (after loosening holding devices not shown) until one of the notches in the ring 48 is opposite the contact (for example 46) to be rendered inoperative. This will cause the contact finger 32 to drop down to an inoperative position in the notch. When the rotation of the holder 2' has carried the contact fingers past this position, the contact finger 32 again will ride normally on the ring 48. When, however, the notches are not in a position opposite any of the conductive inserts on the ring 2 the coil 35 is energized by the completion of circuit 33, 34 upon encounter of the contact finger 31 with one of the conductive inserts, 45, 46, 47, encountered by the contact 31 thereby causing the impingement of X-rays to be shifted on a new segment of the specimen.

What we claim as new and desire to secure by Letters Patent of the United States is:

1. An X-ray goniometer comprising the combination of means for scanning a plane area of a crystalline specimen with a beam of X-rays, means for translating the variations of diffraction of such X-rays into electric impulses of corresponding variation, means for recording said electric impulses, means for displacing the area of impingement of said X-ray beam on said specimen through a chosen radial angle, means for moving said recording, coordinately with such angular displacement and means for shifting the angle of impingement by a small increment about a vertical axis of said specimen.

2. An X-ray goniometer comprising the combination of means for scanning a specimen with a beam of X-rays, means for shifting the angular relation of said specimen and said beam progressively through a predetermined segment of a circumferential zone, means for simultaneously causing relative oscillating movement between said beam and said specimen substantially at right angles to said circumferential zone, means for causing variations of X-rays transmitted through said specimen due to diffraction by crystalline structure to be translated into corresponding electrical impulses and means for recording said impulses.

3. An X-ray goniometer comprising the combination of a frame having an opening, a specimen holder rotatably mounted in said opening, mechanism for reciprocating said frame, means operatively connected to said reciprocating mechanism for imparting a stepwise rotation to said frame, means for transmitting a beam of X-rays through a specimen mounted in said holder and means for recording variations in said beam of X-rays effected by diffraction of X-rays caused by the orientation of crystals in said specimen.

4. An X-ray goniometer comprising the combination of a frame, a specimen holder mounted thereon free to rotate about an axis normal to the surface of said holder, means for transmitting a beam of X-rays through a specimen mounted on said holder, means for rotating said specimen holder about said axis to change the azimuth angle of said beam will respect to said specimen, an electric circuit having contact areas circumferentially displaced on said holder, electric means operatively connected to said contacts for shifting the position of said holder about an axis vertical with respect to the first-mentioned axis, and means for predetermining the operation of said electric means with respect to the rotation of said specimen on the axis normal thereto.

5. The combination of claim 4 further characterized by means including a chart for recording the intensity variations of X-rays transmitted through a specimen on said holder.

6. The combination of claim 5 further characterized by means for indicating on said chart the times at which occurs the shifting of position about said vertical axis.

7. An X-ray goniometer comprising the combination of a frame having an opening, a geared specimen holder rotatably supported therein, a vertical shaft for supporting said frame, means for slidably supporting said vertical shaft, a cylindrical driven cam mechanism provided with a peripheral groove, the latter having an axial extension, a cam follower attached to said vertical shaft and engaging with said groove whereby said vertical shaft is reciprocated, a horizontal shaft having a gear rotatably engaging with the gear on said specimen holder, a ratchet attached to said horizontal shaft, a pawl mounted upon said frame for engaging with said ratchet whereby said horizontal shaft is rotated, means for transmitting a beam of X-rays through said specimen and means for recording a pattern of variation of said rays due to diffraction by the crystalline structure of said specimen.

References Cited in the file of this patent

UNITED STATES PATENTS

| | | |
|---|---|---|
| 2,347,638 | McLachlan, Jr. | Apr. 25, 1944 |
| 2,430,969 | Young | Nov. 18, 1947 |
| 2,490,673 | Champaygne et al. | Dec. 6, 1949 |
| 2,615,136 | Evans, Jr. | Oct. 21, 1952 |
| 2,619,600 | Hamacher | Nov. 25, 1952 |
| 2,688,093 | Dumond | Aug. 31, 1954 |